UNITED STATES PATENT OFFICE.

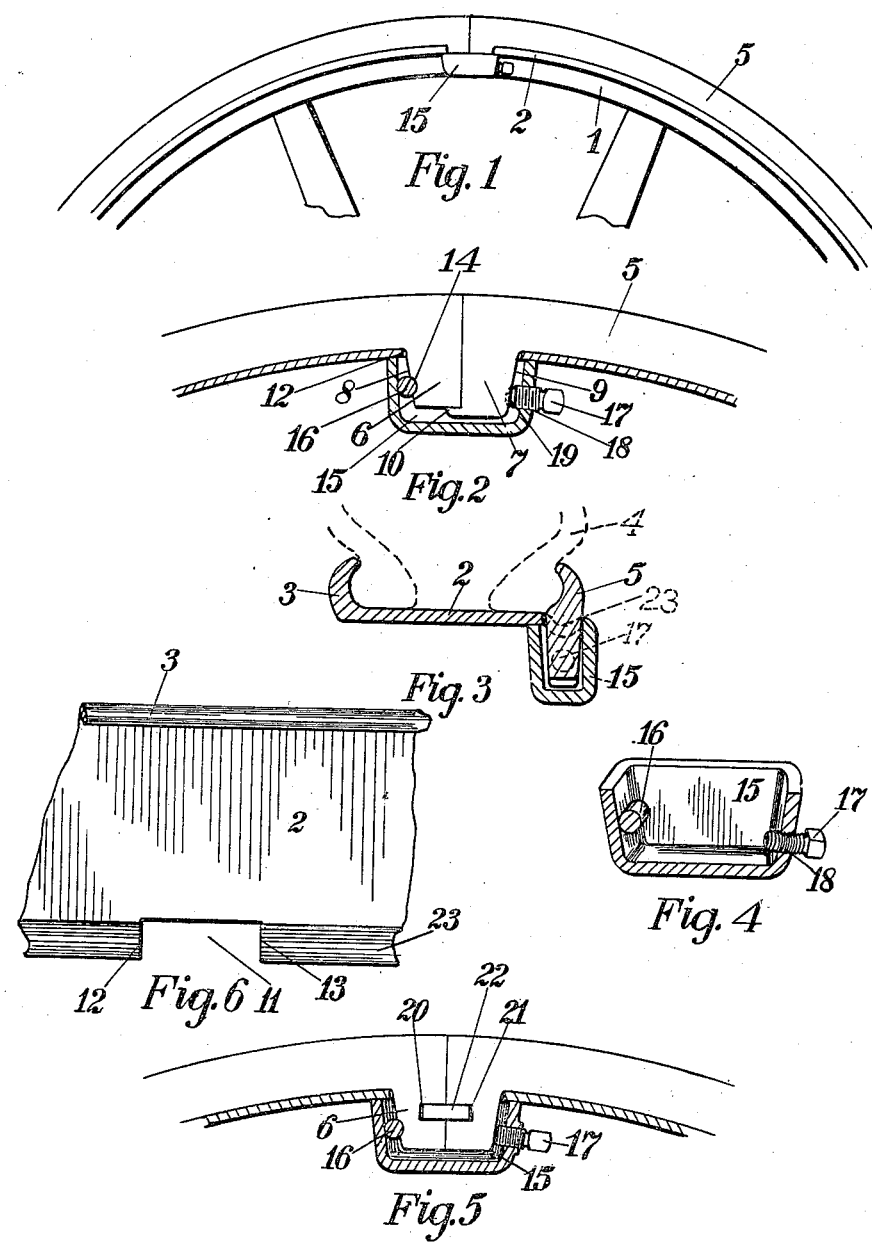

RICHARD S. BRYANT, OF COLUMBUS, OHIO, ASSIGNOR, BY MESNE ASSIGNMENTS, TO THE UNITED RIM COMPANY, OF AKRON, OHIO, A CORPORATION OF OHIO.

TIRE-FASTENING DEVICE.

968,446.  Specification of Letters Patent.  Patented Aug. 23, 1910.

Application filed January 20, 1909. Serial No. 473,385.

*To all whom it may concern:*

Be it known that I, RICHARD S. BRYANT, a citizen of the United States, residing at Columbus, in the county of Franklin and State of Ohio, have invented certain new and useful Improvements in Tire-Fastening Devices, of which the following is a specification.

My invention relates to improvements in tire-fastening devices, and consists especially of the provision of a tire-retaining flange having extensions formed on its ends, and readily detachable gripping means applied to said extensions for the purpose of drawing the fastening device into snug and secure engagement with the rim of a vehicle wheel, whereby a tire is securely held in position thereon.

Specifically, the present invention relates to a device including preferably a cup-shaped member adapted to be positioned upon extensions formed on the ends of an annular tire-retaining flange to inclose and embrace the said extensions; means are carried by the cup member to engage one of the extensions positively, and to engage the others adjustably to bring them into snug abutting relation and to grip the tire-retaining flange firmly upon the rim.

A preferred form of embodiment of my invention is shown in the drawings, which are hereto attached and hereby made a part of this specification, in which—

Figure 1 is a side view of a portion of a vehicle wheel having my device thereon in place; Fig. 2 is a portion of the circumference of a wheel showing the tire-retaining flange, and the retaining device in vertical transverse section; Fig. 3 is a vertical transverse section through the rim and tire in place, taken at the end of the detachable tire-retaining flange; Fig. 4 is a vertical transverse section through the cup-shaped member, detached from the tire-retaining flange disclosing the lug and the clamping or gripping device; Fig. 5 shows an optional method of locking together the extensions on the tire-retaining flange. Fig. 6 is a top plan view of the rim showing the recess or cutout therein.

Referring to the drawings in which the same numeral indicates the same part throughout, 1 is a wheel having a rim 2 formed preferably with the integral flange 3 thereon, the tire being shown at 4, the detachable tire-retaining flange being shown at 5. At its ends the detachable tire-retaining flange 5 is provided with extensions 6 and 7, which are preferably formed with the beveled faces 8 and 9; the extensions may be locked together in a number of ways, one of which is shown in Fig. 2 and another in Fig. 5. Referring to Fig. 2, it is seen that the extension 7 has the projecting lip 10 adapted to underlie the extension 6, and so long as the extension 6 is maintained in its proper position, it is readily seen that the extension 7 will be held in place. In positioning the tire-retaining flange 5, the extension 7 is placed in the cut-out 11 of the rim against the shoulder 13, and the flange is then positioned in the channel 23, around the periphery of the rim body, until the extension 6 is brought into place against the shoulder 12 of the cut-out 11. It is understood that the tire has first been placed upon the rim face to be engaged by the flange 3.

The extension 6 has a transverse recess 14 formed therein, the cup-shaped member 15 has the lug 16 located therein, either cast or inserted in a preferred manner, and this lug 16 is adapted to be inserted in the recess 14, when the member 15 is positioned. The cup-shaped member 15 is adapted to inclose or embrace the extensions 6 and 7, the lug 16 being inserted in the recess or groove 14, the set screw 17 is inserted through the opening 18 formed in said member 15, the inner end of said screw being adapted to enter and engage the depression or recess 18 formed in the extension 7. As the screw 16 is turned, the extensions 6 and 7 are drawn together, it being understood that before the pressure of the set screw is thus applied, the ends of the tire-retaining flange are somewhat separated. In this manner the tire-retaining flange is seated snugly and securely in the channel 23 upon the rim body, and the fastening device thus provides for taking up any slack which may be found in the construction and locking all the parts firmly together, and preventing circumferential movement of the tire-retaining flange when properly positioned. The cup-shaped member exercises the gripping or binding effects above noted, and also incloses the parts in such a way that dust and dirt are effectually excluded; this preserves the parts and also tends to make them more easily manipulated. It is also seen that thereby the ends of the extensions are protected from violence and possible injury due to collisions with objects, or possible injury from any other source during the operation of the vehicle.

In Fig. 5 I have shown an optional form of locking together the extensions on the tire-retaining flange to prevent movement of the same upon each other, and in this figure the extensions are formed with grooves 20 and 21 adapted to be brought into register, whereupon the key 22 may be inserted; when this has been done, neither of the extensions 6 and 7 is free to move in a radial direction without the other. The cup member 15 is then placed on the extensions and secured as above stated.

The specific construction illustrated in the drawings and herein described is a preferred embodiment of my invention, but I do not desire to be limited to such construction, but desire to claim all modifications thereof which are within the spirit of my invention.

What I claim is:

A tire-retaining device comprising a divided tire-retaining flange having extensions formed at its ends, a rim constructed to receive said extensions, one of said extensions having a depression formed thereon, a cup-shaped member having a lug adapted to engage said depression whereby said cup-shaped member may be secured on said extension in a position to embrace said extensions and grip the same together and protect them, means for preventing outward movement of said extensions, and a screw carried by said cup-shaped member for forcing said extensions toward each other whereby said tire-retaining flange is securely positioned upon the rim.

In testimony whereof I affix my signature in the presence of two witnesses.

RICHARD S. BRYANT.

Witnesses:
GEO. W. RIGHTMIRE,
A. RAGER.